United States Patent [19]
Dieling et al.

[11] 3,830,166
[45] Aug. 20, 1974

[54] MOTORIZED SWIVEL TRUCK FOR RAIL VEHICLES, ESPECIALLY STREETCARS

[75] Inventors: Hans Dieling, Rhunda; Manfred Schindehutte, Calden, Ortsteil, both of Germany

[73] Assignee: Wegmann & Co., Kassel, Germany

[22] Filed: June 8, 1973

[21] Appl. No.: 368,379

[52] U.S. Cl............... 105/77, 105/138, 105/182 E, 105/197 B, 105/199 C, 105/206 A, 105/131
[51] Int. Cl............................................ B61c 15/10
[58] Field of Search ........ 105/199 C, 197 B, 224 R, 105/135, 136, 137, 139, 131, 77, 182 E, 182 R, 206 R, 206 A, 202

[56] References Cited
UNITED STATES PATENTS

| | | | |
|---|---|---|---|
| 2,159,814 | 5/1939 | McCune | 105/77 |
| 2,186,008 | 1/1940 | Chapman | 105/206 R |
| 2,955,547 | 10/1960 | Ebenbach | 105/139 |
| 3,022,748 | 2/1962 | Lich | 105/197 B |
| 3,200,769 | 8/1965 | Dobson et al. | 105/138 |
| 3,313,245 | 4/1967 | Sundby | 105/206 R |

Primary Examiner—M. Henson Wood, Jr.
Assistant Examiner—John J. Love
Attorney, Agent, or Firm—Burgess, Dinklage & Sprung

[57] ABSTRACT

A motorized swivel truck for rail vehicles, especially streetcars, having a truck frame on which a cradle frame lying transversely of the direction of travel is supported by an air spring bellows, and the car body rests upon the cradle frame through an annular ball bearing which permits wide swiveling of the swivel truck. The swivel truck frame consists of two longitudinal members having a generally underslung configuration and whose middle, underslung portion has an open cross-sectional profile, and two transverse members which are disposed between the wheel axles and have a likewise open cross-sectional profile and which have a generally arched configuration, and whose ends are welded to the end portions of the longitudinal members. Owing to the underslung and arched configurations and the open cross-sectional profiles the swivel truck frame is flexible, so that the wheel bearings may be mounted with very stiff springing in the end portions of the longitudinal members. The motor is suspended on the cross members by resiliently yielding means such that its drive shaft lies parallel to the direction of travel, the driving of the wheel axles is performed through a bevel gear transmission and a flexible coupling, and the air spring bellows are located adjacent the ends of the cradle frame.

11 Claims, 20 Drawing Figures 3,830,166

MOTORIZED SWIVEL TRUCK FOR RAIL VEHICLES, ESPECIALLY STREETCARS

BACKGROUND OF THE INVENTION

FIELD OF THE INVENTION

The invention relates to a swivel truck for rail vehicles, especially for streetcars, which is capable of pivoting to such an extent that curves even of small radius can be negotiated.

The invention particularly concerns a swivel truck for rail vehicles, which is flexible, i.e., a truck in which, when one of the wheel axis bearings or one of the contact points between the wheels and the rails is lifted out of the plane of the other three wheel axle bearings or contact points, the contact pressures do not become any higher than is permitted in the case of vehicles having sprung axle bearings.

The invention furthermore concerns a two-axle swivel truck in which both wheel axles are driven by a motor. The invention additionally relates to a flexible, motor-powered swivel truck in which the motor is resiliently suspended and a resilient torque coupling is inserted into the drive between the motor shaft and the wheel axle.

The invention also concerns a swivel truck in which the cradle frame is supported on the swivel truck frame by air spring bellows, the air spring bellows being disposed adjacent the ends of the cradle frame to prevent the rocking of the car body. The invention especially relates to such an air spring bellows cushioned swivel truck in which displacements of the cradle frame against the swivel truck frame in the horizontal plane are restricted by stops and buffers of resilient material or by resiliently mounted horizontal tie rods, without hampering displacements in the vertical direction.

The invention additionally relates to a motorized swivel truck in which the longitudinal truck frame members are of an underslung configuration between the points at which the cross members are welded, and the cross members are of an arched configuration, the motor being suspended from the cross members on resilient suspension means.

The invention lastly concerns a flexible swivel truck with stiffly sprung axle bearings and a magnetic track brake suspended directly from the truck frame.

SUMMARY OF THE INVENTION

Broadly, this invention contemplates a motor powered swivel truck for rail vehicles, especially for streetcars, comprising a swivel truck frame, a cradle frame, an air spring bellows disposed between said swivel truck frame and said cradle frame, an annular ball bearing disposed between the cradle frame and a car body and connected to said car body through its upper race, and an electric motor disposed on said swivel truck frame consisting of two longitudinal members, each of whose middle portion is disposed at a level below the end portions thereof and has an open profile, said end portions thereof having a closed profile and having recesses for receiving wheel bearings, a pair of cross members each of which is disposed between the wheel axles and each of which has an open profile and a middle portion disposed at a level above its end portions, the ends of said cross members being welded to the end portions of said longitudinal members, said air spring bellows disposed adjacent the ends of said cradle frame, said motor being suspended from said cross members such that its drive shaft lies parallel to the direction of travel.

BRIEF DESCRIPTION OF DRAWINGS

An embodiment of the swivel truck of the invention is represented in the drawings, from which additional features and advantages of the invention will become apparent.

DESCRIPTION OF SPECIFIC EMBODIMENTS

Figure 4:
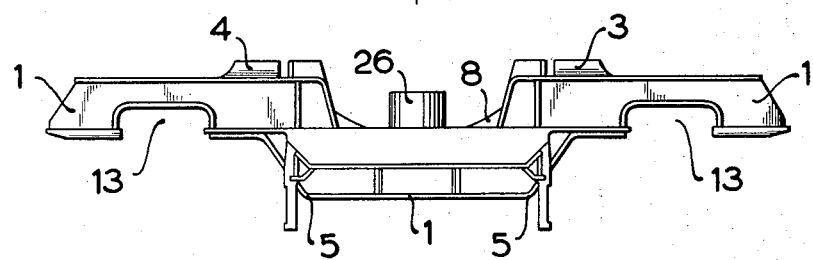
FIG. 4 is a side elevational view of the swivel truck frame of FIG. 3 as seen in the direction of arrow IV therein.
Figure 5:
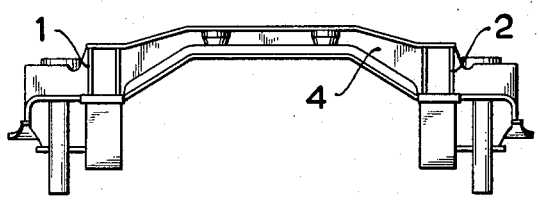
FIG. 5 is a view of the swivel truck of FIG. 3 as seen in the direction of arrow V therein.
Figure 6:
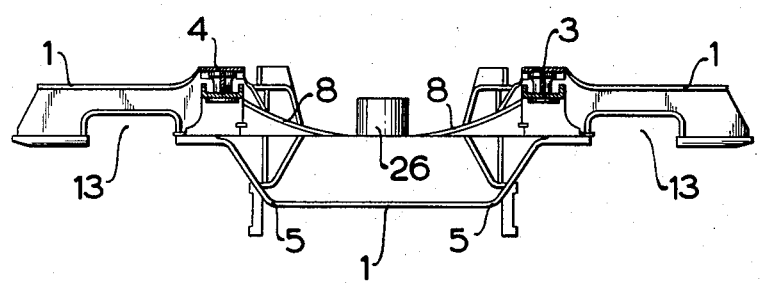
FIG. 6 is a cross sectional view of the swivel truck of FIG. 3, taken along line VI—VI thereof.
Figure 7:
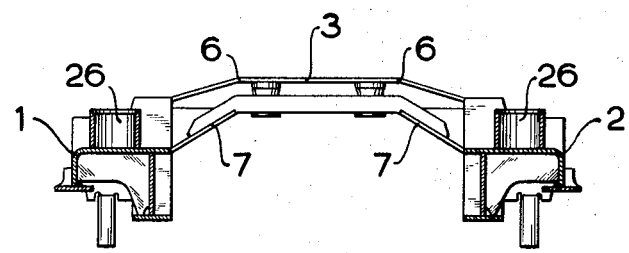
FIG. 7 is a cross sectional view of the truck of FIG. 3, taken along line VII—VII thereof.
Figure 8:
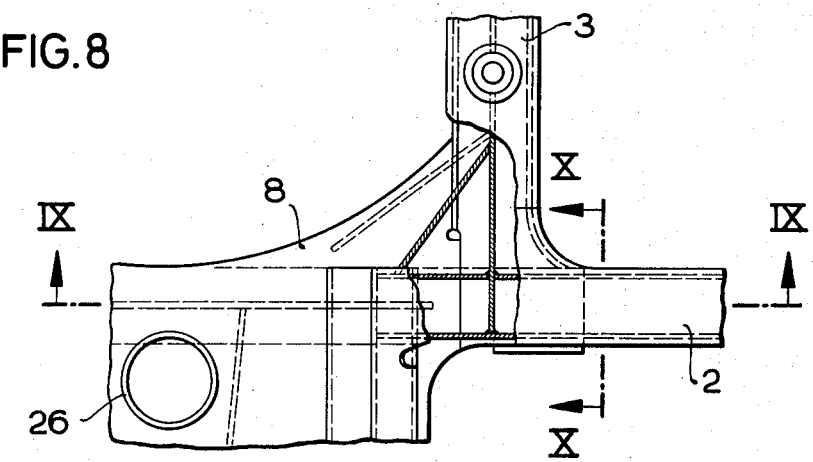
FIG. 8 is a partially cut-away view of that portion of FIG. 3 which is defined by the dash-dotted line VIII.
Figure 9:
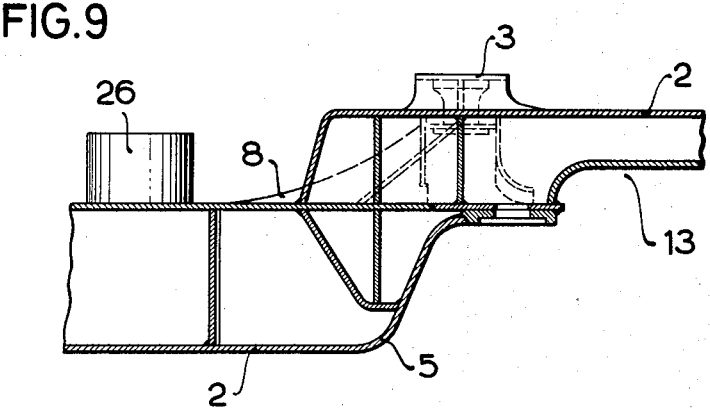
FIG. 9 is a cross section of the part represented in FIG. 8, taken along line IX—IX.
Figure 10:
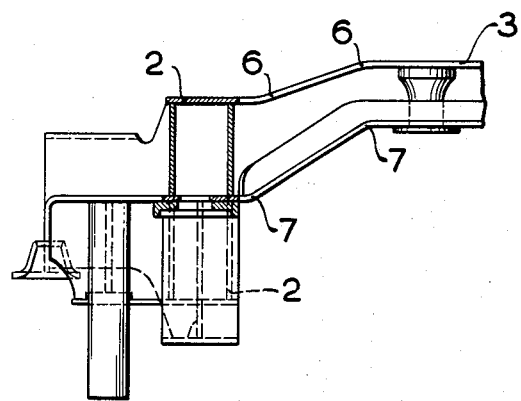
FIG. 10 is a cross sectional view of the part represented in FIG. 8, taken along line X—X.

The frame of the swivel truck represented in the drawings consists of the longitudinal members 1 and 2 and the cross members 3 and 4 whose ends are welded to the longitudinal members. As best seen in FIG. 4, the longitudinal members are of an underslung configuration in their central portion between the points at which the cross members are welded. The longitudinal members are of an open cross section in their middle portion. A frame member or girder of open cross section is capable of torsion, in contrast to a girder of closed cross section, i.e., one having a tubular or box-shaped cross section, the longitudinal flanges of the open cross section shifting longitudinally in relation to one another as the girder is twisted. This shifting may not be restrained, because otherwise high material stresses counteracting the twist would occur. The The underslung configuration of the longitudinal members bring it about that the longitudinal movements which occur when the frame member is twisted are able to act upon the bent portions 5 without producing excessively great material stresses. Those portions of the longitudinal members which extend beyond the points at which the cross members are welded have, however, a closed profile and, as shown in FIG. 10, they have a box cross section, so that these sections of the longitudinal frame members are not fundamentally capable of torsion or offer such great resistance to torsional forces that no perceptible twisting can occur. The cross members 3 and 4 also have an open profile and are constructed in the manner of I-beams. These cross members are arched slightly as shown in FIG. 7. Here, again, the longitudinal movements which occur upon torsion can act at the bends 6 and 7 so that the cross members are fundamentally capable of torsion without producing unacceptable material stresses at the welds which would tend to prevent any longitudinal displacement of the upper and lower flanges. Through this construction of the swivel truck it is brought about that the entire truck is capable of torsion, i.e., if one end of one of the longitudinal members is lifted up while the other three ends remain at rest, no great reaction forces will occur, but only forces which are approximately equal to the forces which occur in the axle springing in rigid swivel trucks when one wheel is lifted. The flexible swivel truck thus provides springing for the sheel axle bearings through deformation of the truck without requiring additional wheel axle springing systems.

So that this flexible swivel truck may have the necessary corner stiffness, arcuate plates 8 are welded in at both sides between the longitudinal and cross members. These plates, without impairing flexibility, establish the angle between the longitudinal and cross members and thus prevent longitudinal displacement of the two longitudinal members in relation to one another.

Figure 11:
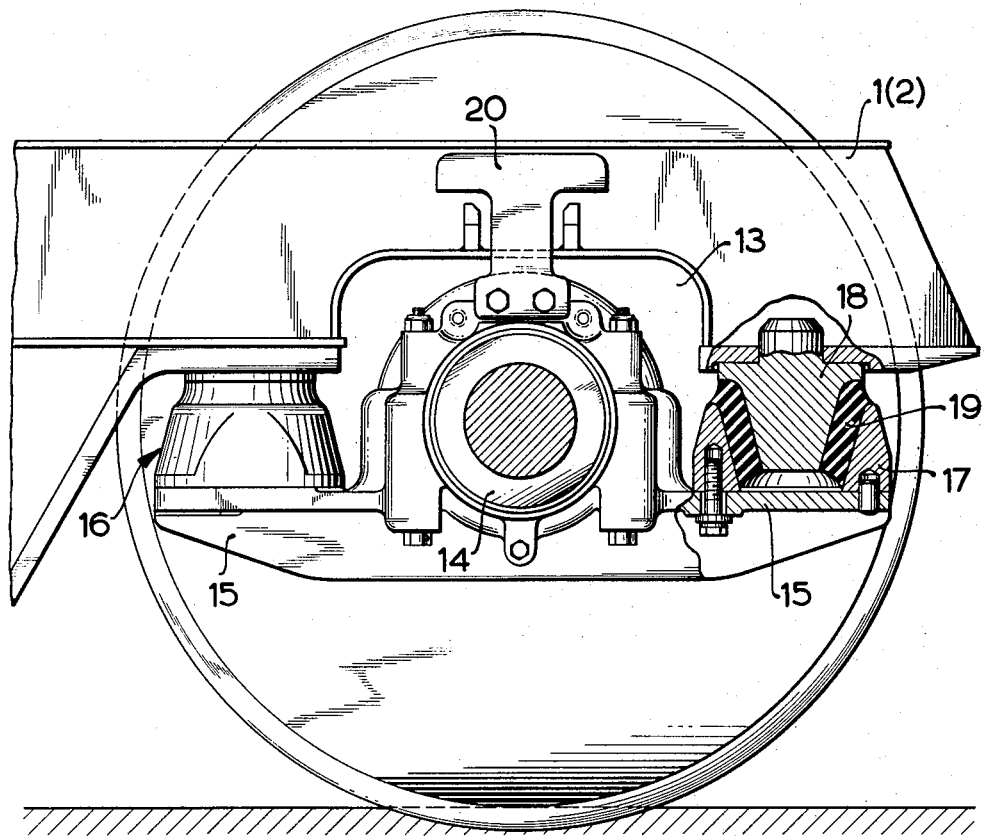
FIG. 11 is an enlarged, partially cut-away view of a wheel axle bearing of the swivel frame of FIG. 1.

The swivel truck frame 1 rests on the two wheel axles 11 and 12. Cut-outs 13 are provided in the longitudinal members 1 and 2 for the mounting of the wheel axles. One wheel axle mounting is shown in FIG. 11. The wheel axle bearings 14, which can best be in the form of a ball or roller bearing, have two lateral arms 15 on which the longitudinal members 1 or 2 are supported. Between the arms 15 and the longitudinal members 1 or 2, frame support pad sssemblies 16 are inserted, each consisting of a tapered socket 17, a cone 18 and a resilient cushion 19. These frame support pad assemblies provide a very stiff springing, i.e., they permit only slight movements of the wheel axle bearing 14 in relation to the longitudinal member, that is, they do not serve for the spring suspension of the vehicle itself, but only to improve the running characteristics of the wheel and axle assemblies whose axle bearings are capable, by virtue of this springing, of moving slightly longitudinally of the vehicle when the vehicle is negotiating curves. Furthermore, these frame support pad assemblies absorb vibrations of the wheel axle bearings. A safety device 20 assures that the frame will not be able to lift completely away from the wheel axle bearings, and that, if the wheel runs out of contact with the rail, the axle bearings will not be able to drop out.

A cradle frame 23 is disposed above the swivel truck frame transversely of the direction of travel. This cradle frame rests upon the swivel truck frame by means of two toroidal air spring bellows 24 and 25, which are disposed as near as possible to the end of the cradle frame.

Figure 3:
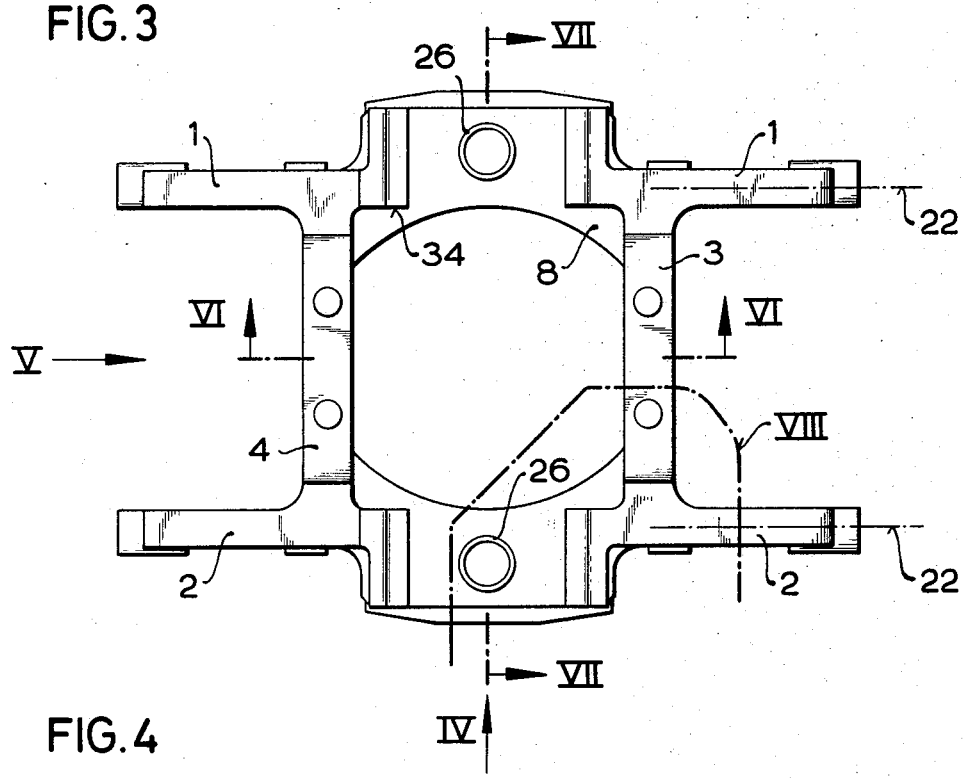
FIG. 3 is a top plan view of the swivel truck frame.

To prevent the car body from tilting too far to one side when unevenly loaded or when negotiating curves, the distance between these air spring bellows is as great as possible, i.e., as great as the radius of the air spring bellows will permit without exceeding the prescribed car profile. It is desirable for the centers of the air spring bellows to be located outside of the vertical plane 22 passing through the centers of the wheel axle bearings (see FIG. 3).

Figure 12:
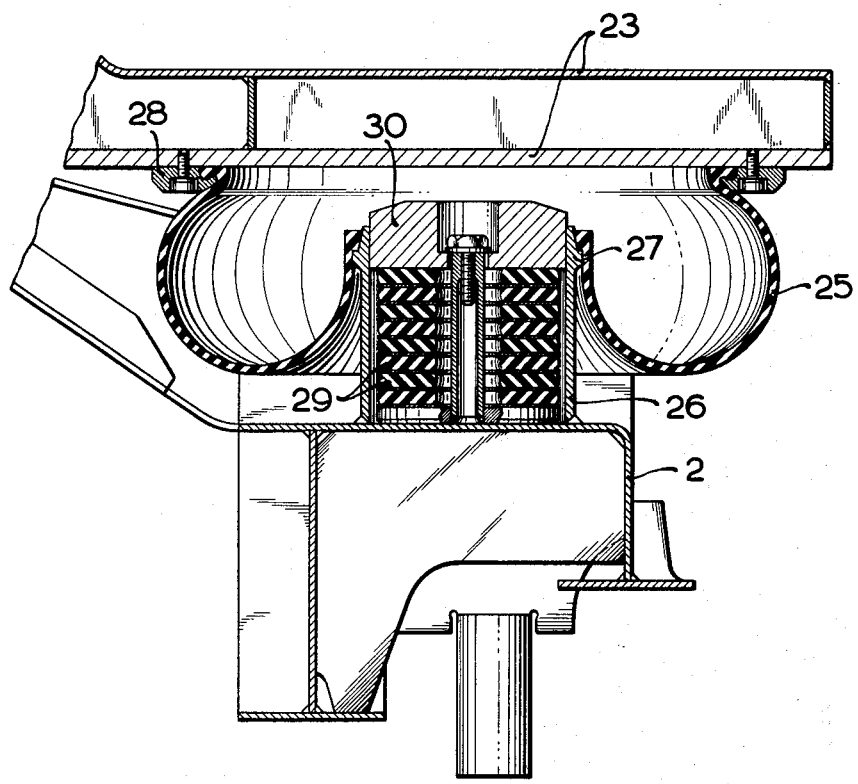
FIG. 12 is a cross sectional view of an air spring bellows taken along line XII—XII of FIG. 1.

One of these air spring bellows is represented in FIG. 12. In the center of the outwardly extended middle portion of longitudinal member 2 there is welded a cylinder 26 whose upper end forms the one rim 27 for the air spring bellows 25. The other rim 28 for the air spring bellows is fastened to the underside of cradle frame 23 by means of screws. In case the air spring bellows should fail to have the necessary internal pressure and the car body should sink dangerously downward, an emergency cushioning system 29 is provided within the cylinder 26 in the form of a set of rings of resilient material having a head 30 on which the cradle frame 23 will rest in the event of failure of the air spring bellows. The cylinder 26 serves simultaneously as an addition to the volume of the air spring bellows.

Figure 13:
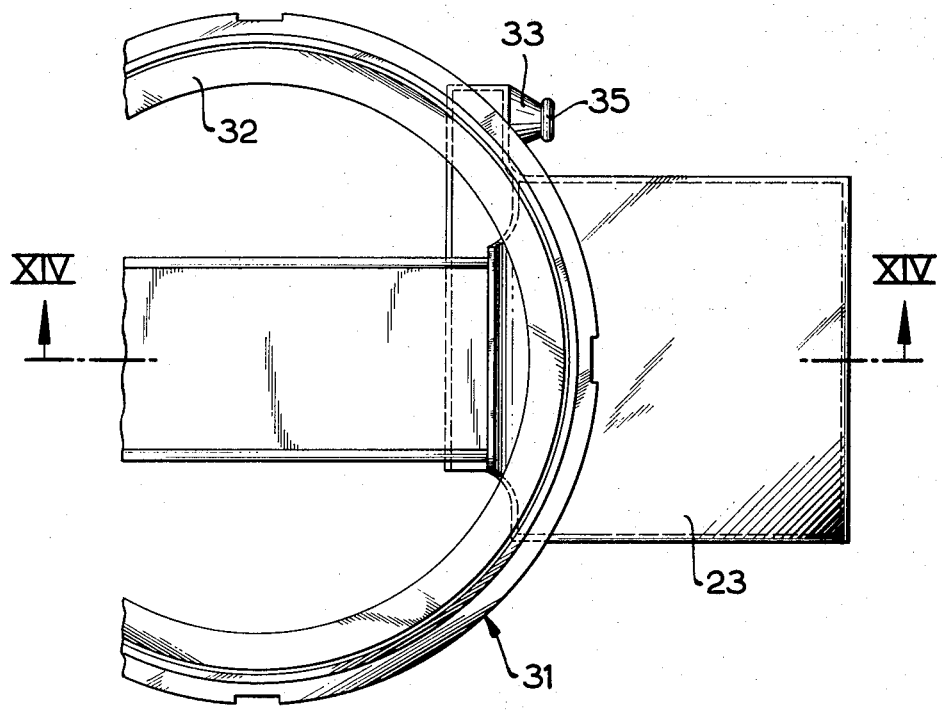
FIG. 13 is a top plan view of a portion of the cradle frame and circular ball bearing of the swivel truck of FIG. 1.
Figure 14:
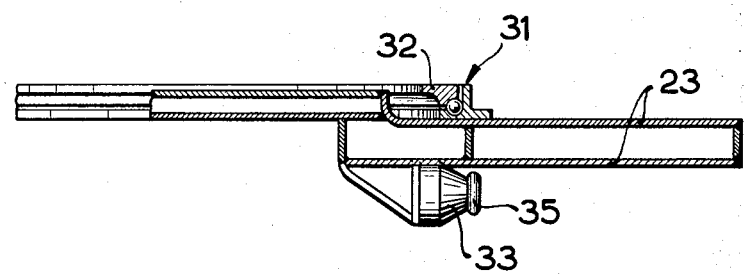
FIG. 14 is a cross sectional view of the cradle frame and circular ball bearing taken along line XIV—XIV of FIG. 13.

On the top of the cradle frame 23 there is provided, as seen in FIGS. 13 and 14, an annular ball bearing 31 whose upper race 32 is affixed to the car body, which is not shown. It is the purpose of this annular ball bearing to permit the entire swivel truck to swivel widely on the car body when negotiating curves of short radius. To provide stable support for the car body the annular ball bearing has a large radius, amounting advantageously to more than one quarter of the distance between the centers of the air spring bellows.

Inasmuch as the air spring bellows would permit great displacements of the cradle frame in the horizontal plane with respect to the swivel truck frame, it is necessary to limit the displacements in the horizontal direction between the cradle frame and the swivel truck frame without hampering vertical movements. For this purpose there are provided on the cradle frame 23 the buffers 33 located opposite and a short distance away from the stop surfaces 34 on the swivel truck frame, and provided with a resilient pad 35. These buffers permit displacements between the cradle frame and the truck frame both in the vertical direction and in the horizontal longitudinal direction, but they limit transverse displacements to the amount of distance between the pads 35 and the stop surfaces 34.

To limit longitudinal displacements between the truck frame and the cradle frame and at the same time to transmit the traction force from the truck to the car body, buffers can be provided in the longitudinal direction along with stop surfaces. Instead of such buffers, longitudinally disposed tie rods 37 are provided here in order to limit longitudinal displacements and absorb the traction forces. The one eye 38 of the tie rod is bolted to the cradle frame, and the other eye 39 is bolted to the truck frame. In both eyes, soft, resilient inserts are provided between the inner wall of the eye and the bolt, which permit slight longitudinal movements between cradle frame and truck frame and thereby especially equalize severe shocks, while on the other hand the tie rods 37 prevent rotation of the cradle frame against the swivel truck frame, so that when the truck swivels it will turn with the truck in relation to the car body. On the other hand, vertical movement of the cradle frame in relation to the truck frame when the air spring bellows 25 acts is easily possible, and in that case the tie rod will pivot about the bolt in eye 39, while the bolt in eye 38 will be able to tilt, with a slight deformation of the resilient insert.

Figure 15:
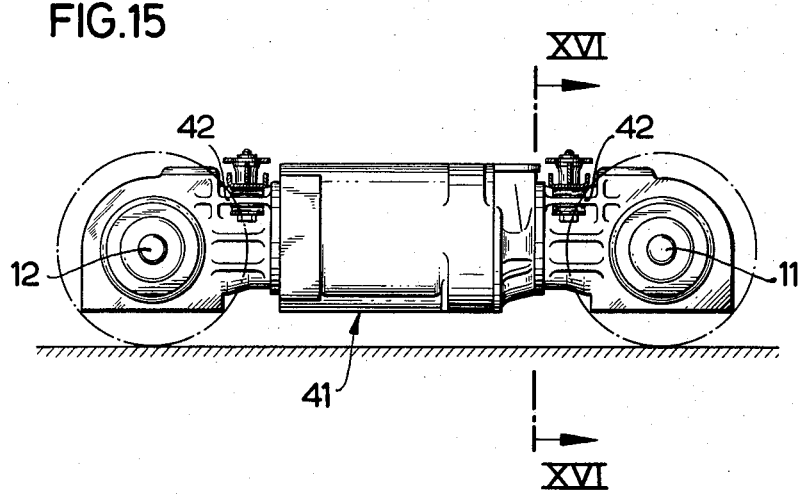
FIG. 15 is a diagrammatic side elevational view of the swivel truck of FIG. 1 showing the motor suspension in cross section.
Figure 16:
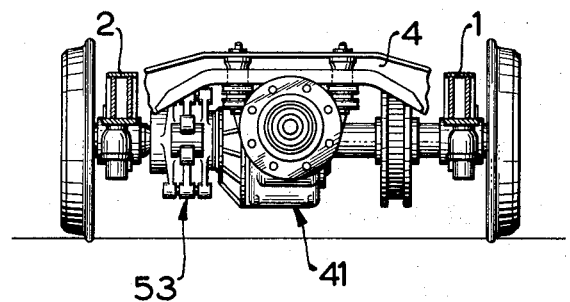
FIG. 16 is a cross sectional view taken along line XVI—XVI in FIG. 15.
Figure 17:
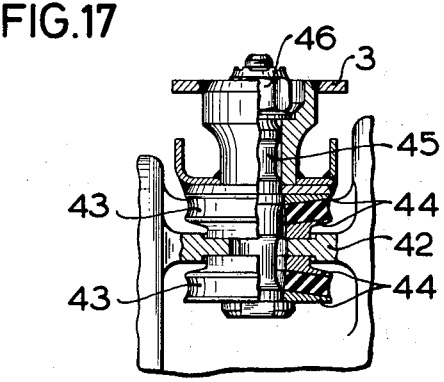
FIG. 17 is a partially cross sectional view of a detail from FIGS. 15 and 16.

The drive motor 41 is suspended from the cross members 3 and 4, and its longitudinal axis is located approximately at the level of the wheel axles, owing to the underslung longitudinal members and arched cross members. Since when the truck twists the two cross members do not remain parallel to one another it is necessary that the motor have a resilient suspension which permits these movements of the cross members. This suspension is represented in FIGS. 15 to 17. Two lugs 42 are provided on each side of the motor housing 41. On each side of each lug 42 there is provided a resilient insert between holding rings 44, and a bolt 45 is passed through the entire assembly and through the cross members 3 and 4, respectively, and is fastened by means of a nut 46.

Figure 18:
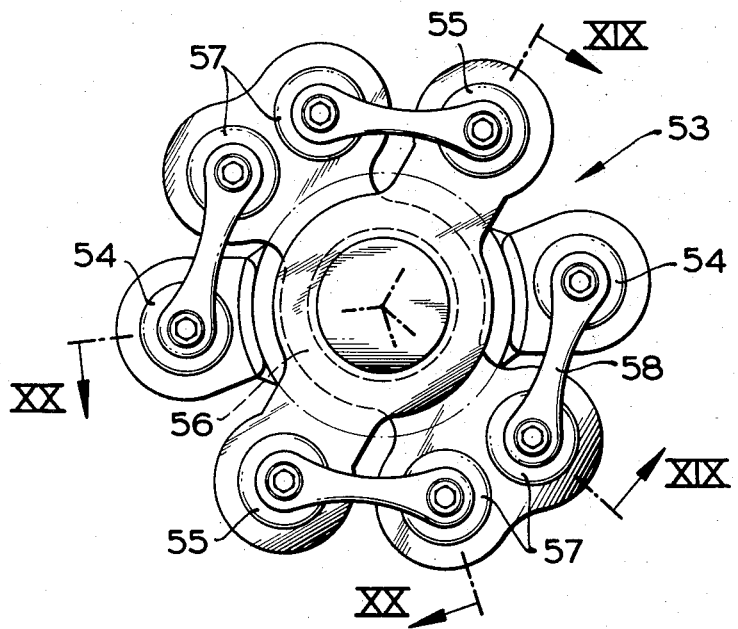
FIG. 18 is a top plan view of the torque coupling of a wheel axle.
Figure 19:
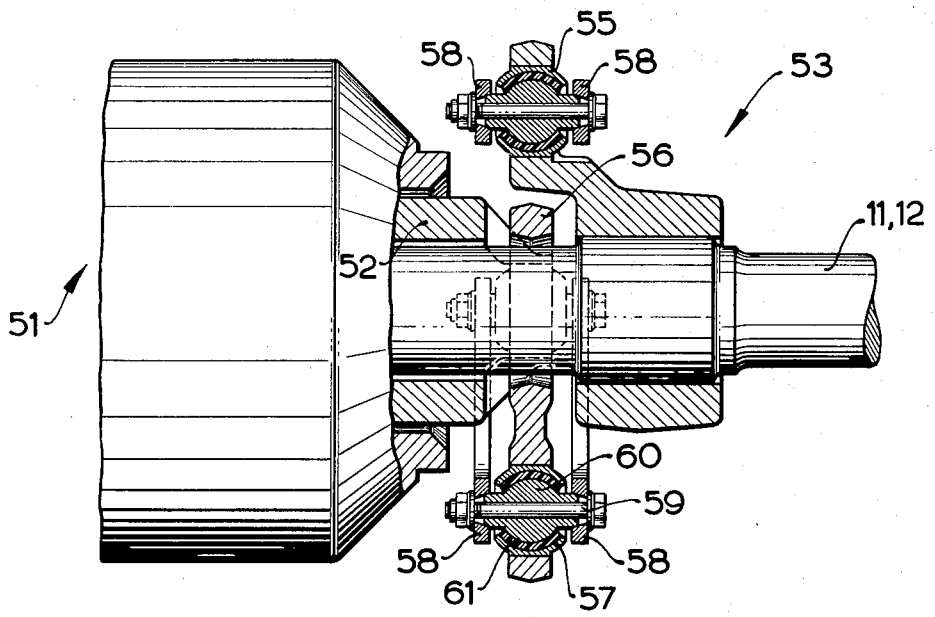
FIG. 19 is a cross sectional view of the torque coupling of FIG. 18 taken along line XIX—XIX.
Figure 20:
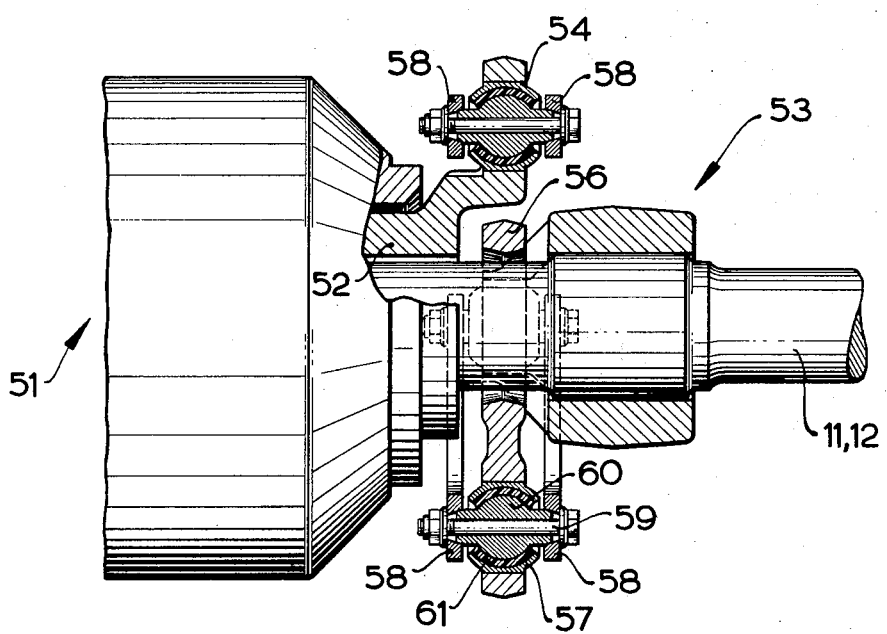
FIG. 20 is a cross sectional view of the torque coupling of FIG. 18 taken along line XX—XX.

To each end of the drive motor there is connected a bevel gear drive 51 which is represented only diagrammatically. The wheel axle 11 (12) is passed through this bevel gear drive with sufficient clearance to allow for the twisting of the swivel truck frame and the journal bearing. The bevel gear drive 51 drives a hollow shaft 52 surrounding the wheel axle. The transmission of the torque from the hollow shaft to the wheel axle is performed by means of the torque coupling 53 represented in FIGS. 18 to 20. This torque coupling consists of the two ball sockets 54 affixed to the hollow shaft, the two ball sockets 55 affixed to the wheel axle, and an annular intermediate piece 56 bearing pairs of ball sockets 57. One ball socket 57 of each pair is connected by links 58 on both sides to a ball socket 54, and the other is connected by links 58 on both sides to a ball socket 55. Within the ball sockets the bolt 59, which holds the links together, is surrounded by a ball 60, and between this ball and the ball socket there is a resilient insert 61 by which severe shocks and vibrations are absorbed.

A magnetic rail brake 65 is suspended from the truck. Magnetic rail brakes will act only when they are close to the top of the rail at the moment when braking begins. In swivel trucks with spring-mounted axles, however, the height of the swivel truck frame above the top of the rail is very greatly controlled by the loading of the vehicle, so that special adjusting devices are needed in order to assure that the magnetic rail brake will always be very close to the top of the rail on both sides of the truck, even when vehicle loading and position at equilibrium vary. In the swivel truck of the invention, the height of the truck frame above the rail varies hardly at all, and it is therefore possible to suspend the magnetic rail brake 65 directly from the truck frame by means of a manually adjustable hanger 66.

Figure 1:
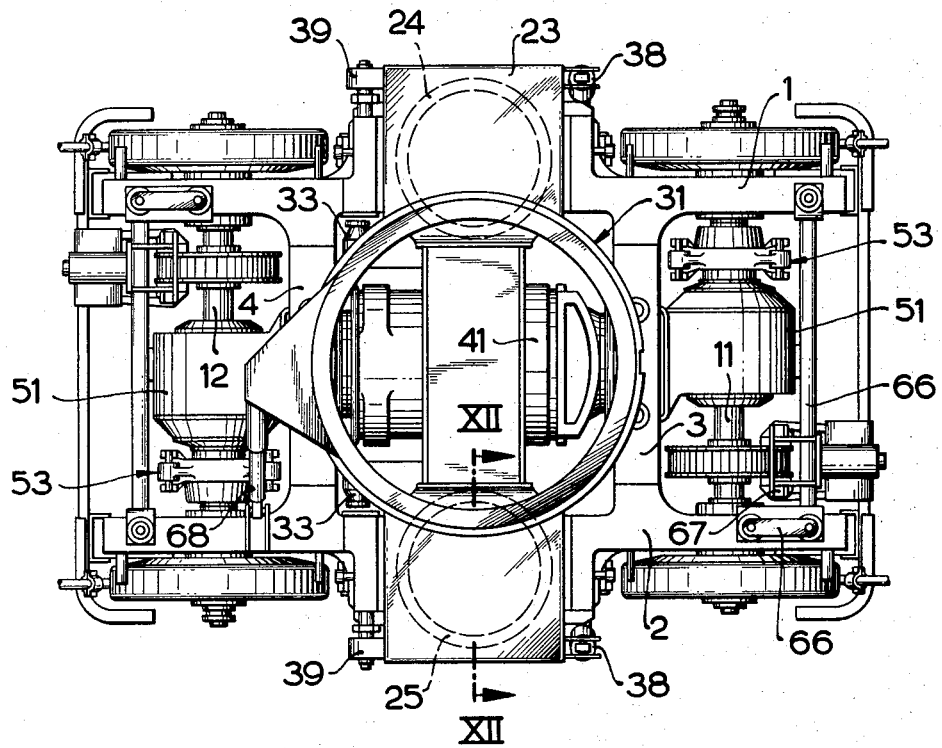
FIG. 1 is a top view of the motorized swivel truck, with the car body removed.
Figure 2:
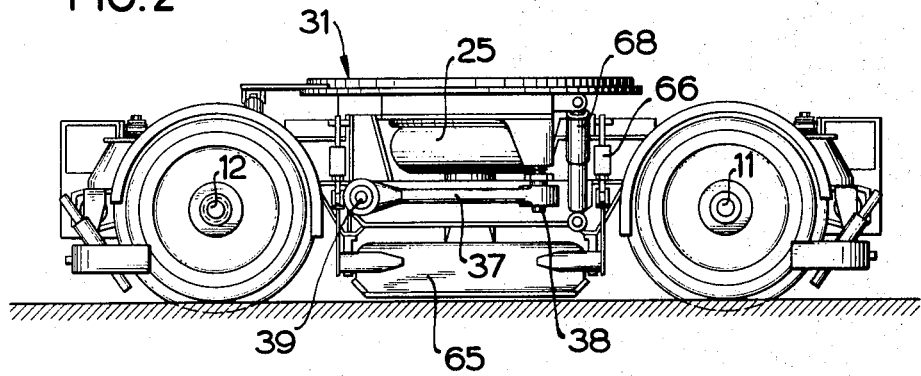
FIG. 2 is a side elevational view of the swivel truck of FIG. 1.

The brake linkage 66 and brakes 67 (FIG. 1) are installed in a conventional manner and do not pertain to the subject matter of the invention. Shock dampers 68, with which everyone skilled in the art is familiar, are provided in order to damp transverse oscillations.

What is claimed is:

1. A motor powered swivel truck for rail vehicles, especially for street cars, comprising a swivel truck frame, a cradle frame, an air spring bellows disposed between said swivel truck frame and said cradle frame, an annular ball bearing disposed between the cradle frame and a car body and connected to said car body through its upper race, an electric motor disposed on the swivel truck frame, said swivel truck frame comprising two longitudinal members, the middle portion of each being disposed at a level below the end portions thereof and having an open profile, the end portions thereof having a closed profile and having recesses for receiving wheel bearings, a pair of cross members, each of which is disposed between the wheel axles and has an open profile and a middle portion which is disposed at a level above its end portions, the end portions of said cross members being welded to the end portions of the longitudinal members, said air spring bellows being disposed adjacent the ends of the cradle frame, said motor being disposed from the cross members such that its drive shaft lies parallel to the direction of travel.

2. A motor powered swivel truck for rail vehicles, especially for streetcars, comprising a swivel truck frame, a cradle frame, an air spring bellows disposed between said swivel truck frame and said cradle frame, an annular ball bearing between the cradle frame and a car body, and an electric motor disposed on said swivel truck frame, said swivel truck frame comprising two longitudinal members, each of whose middle portion is disposed at a level below its end portions and has an open profile, said end portions having a closed profile and recesses for receiving wheel bearings, a pair of cross members disposed between the wheel axles and having an open profile and having ends welded to the end portions of said longitudinal members, said air bellows being disposed toward the end of the cradle frame, a gripping bead of the air spring bellows being joined to a rim mounted in the middle of one of the longitudinal members, another gripping bead of said air spring bellows being joined to a rim affixed to said cradle frame, said motor being suspended from said cross members.

3. A motorized swivel truck according to claim 1 wherein a rim is joined to an inner gripping bead of said air spring bellows which is disposed on a cylinder which is closed with the exception of an aperture within the rim and serves as additional volume.

4. A motorized swivel truck for rail vehicles, especially for streetcars, comprising a swivel truck frame, a cradle frame, air spring bellows disposed between said swivel frame and said cradle frame, an annular ball bearing between said cradle frame and a car body, an electric motor disposed on the swivel truck frame, said swivel truck frame comprising two longitudinal members whose middle portion is disposed beneath the end portions and has an I profile, said end portions having a box profile and recesses to receive wheel bearings, said cross members having an I profile, and disposed between the wheel axles, the middle portion of each of said cross members being disposed on a higher level than the ends thereof, said ends welded to the box profile end portions of the longitudinal members, said air spring bellows being disposed adjacent the ends of the cradle frame such that their centers lie outside of the vertical plane passing through the wheel bearings, said motor being suspended from said cross members such that its drive shaft lies parallel to the direction of travel.

5. A motorized swivel truck for rail vehicles, especially for streetcars, comprising a swivel truck frame, a cradle frame, an air spring bellows disposed between said swivel truck and said cradle frame, an annular ball bearing disposed between said cradle frame and a car body, an electric motor disposed on said swivel truck frame, said swivel truck frame comprising two longitudinal members each of whose middle portion is disposed on a lower level than the end portions thereof and has an open profile, said end portions thereof having a closed profile and recesses to receive wheel bearings, a pair of cross members disposed between the wheel axles and having an open profile, the middle portion of said cross members being disposed on a higher level than the ends thereof, said ends being welded to the end portions of the longitudinal members, said air spring bellows disposed adjacent the ends of the cradle frame, buffers of resilient material disposed between stop surfaces on the cradle frame and stop surfaces on the swivel truck frame to permit an effortless mutual movement in the vertical direction and limit horizontal movements.

6. Motorized swivel truck for rail vehicles, especially streetcars, comprising a swivel truck frame, a cradle frame, an air spring bellows disposed between said swivel truck frame and said cradle frame, an annular ball bearing between said cradle frame and a car body and an electric motor disposed on said swivel truck frame, said swivel truck frame comprising two longitudinal members whose middle portion is disposed at a level lower than the end portions thereof, which middle portion has an open profile, said end portions thereof having a closed profile and recesses to receive wheel bearings, two cross members which are disposed between the wheel axles, which have an open profile, and whose middle portion is disposed a level above the ends thereof, said ends welded to the end portions of said longitudinal member, said air spring bellows disposed adjacent the ends of said cradle frame, said cradle frame joined to the swivel truck frame by tie rods lying in the direction of travel whose eyes, joined to the cradle frame and to the swivel truck frame, respectively, are provided with resilient inserts.

7. A motorized swivel truck for rail vehicles, especially streetcars, comprising a swivel truck frame, a cradle frame, an air spring bellows disposed between the swivel truck and the cradle frame, an annular ball bearing disposed between said cradle frame and a car body, an electric motor disposed on said swivel truck frame, said swivel truck frame comprising two longitudinal members, each of whose middle portion is disposed at a lower level than the end portion thereof and has an open profile, said end portions having a closed profile and recesses to receive wheel bearings, two cross members disposed between the wheel axles, each of said cross members having an open profile and a middle portion disposed a level above the ends thereof, said ends thereof welded to end portions of said longitudinal members, said air spring bellows disposed adjacent the ends of the cradle frame, said motor suspended from the cross members in the longitudinal direction from the inter-position of resilient fastening members.

8. A motorized swivel truck for rail vehicles according to claim 7, wherein the drive shaft of the motor is connected to the wheel axles through a bevel gear transmission which drives a hollow shaft surrounding the wheel axles and a resilient coupling which transfers the torque from the hollow shaft to the wheel axle.

9. A motorized swivel truck for rail vehicles, especially streetcars, comprising a swivel truck frame, a cradle frame, an air spring bellows disposed between the said swivel truck frame and said cradle frame, an annular ball bearing disposed between said cradle frame and a car body and an electric motor disposed on said swivel truck frame, said swivel truck frame comprising two longitudinal members, each of whose middle portion is disposed at a level lower than the end portions thereof and has an open profile, said end portions thereof having a closed profile and recesses to receive wheel bearings, two cross members disposed between the wheel axles and having an open profile and whose ends are welded to the end portions of said longitudinal members, said air spring bellows disposed adjacent the ends of said cradle frame and being toroidal in shape, one gripping bead of said air spring bellows being joined to a rim mounted in the center of one of said longitudinal members and another gripping bead joined to a rim fastened to said cradle frame, said motor being suspended from the cross members, the radius of said annular ball bearing being greater than one-quarter of the distance between the centers of the air spring bellows.

10. A motorized swivel truck for rail vehicles, especially for streetcars, comprising a swivel truck frame, a cradle frame, air spring bellows disposed between said swivel truck frame and said cradle frame, an annular ball bearing between said cradle frame and a car body and an electric motor disposed on said swivel truck frame, said swivel truck frame comprising two longitudinal members, each of whose middle portion is disposed at a level lower than the end portions thereof and has an open profile, said end portions thereof having a closed profile and recesses to receive the wheel bearings, the axle bearings being mounted with the interposition of rubber bearings with stiff springing in the vertical and horizontal directions, and two cross members disposed between the wheel axles, each of which has an open profile, each of whose middle portion is disposed at a level above the ends thereof, said ends thereof being welded to the end portions of said longitudinal members, said air spring bellows disposed adjacent the ends of said cradle frame, said motor being so suspended from the cross members that its drive shaft lies parallel to the direction of travel.

11. A motorized swivel truck for rail vehicles according to claim 1, wherein a magnetic rail brake is suspended directly from said swivel truck frame.

* * * * *